(12) United States Patent
Danielsson et al.

(10) Patent No.: US 9,996,481 B2
(45) Date of Patent: Jun. 12, 2018

(54) DYNAMIC MEMORY ACCESS MANAGEMENT

(75) Inventors: Torkel Danielsson, Linköping (SE); Jan Håkegård, Linköping (SE); Anders Gripsborn, Ljungsbro (SE); Björn Hasselqvist, Jönköping (SE)

(73) Assignee: SAAB AB, Linköping (SE)

(*) Notice: Subject to any disclaimer, the term of this patent is extended or adjusted under 35 U.S.C. 154(b) by 463 days.

(21) Appl. No.: 14/409,691

(22) PCT Filed: Jun. 21, 2012

(86) PCT No.: PCT/SE2012/050701
§ 371 (c)(1),
(2), (4) Date: Sep. 15, 2015

(87) PCT Pub. No.: WO2013/191606
PCT Pub. Date: Dec. 27, 2013

(65) Prior Publication Data
US 2015/0378936 A1   Dec. 31, 2015

(51) Int. Cl.
*A61B 5/00* (2006.01)
*A61K 31/785* (2006.01)
(Continued)

(52) U.S. Cl.
CPC ........ *G06F 12/1458* (2013.01); *G06F 9/5016* (2013.01); *G06F 2212/1052* (2013.01); *H04L 67/12* (2013.01)

(58) Field of Classification Search
CPC ...... A61B 5/00; A61B 5/4064; A61K 31/785; A61K 38/2278; C12Q 1/6883;
(Continued)

(56) References Cited

U.S. PATENT DOCUMENTS

| 5,017,141 A | 5/1991 | Relf et al. |
| 5,966,541 A | 10/1999 | Agarwal |
| (Continued) | | |

FOREIGN PATENT DOCUMENTS

| EP | 2237155 A2 | 10/2010 |
| EP | 2237155 A3 | 5/2012 |

OTHER PUBLICATIONS

Supplementary European Search Report—dated Jul. 5, 2016 (Issued in Application No. EP12879468).
(Continued)

*Primary Examiner* — Yaima Rigol
(74) *Attorney, Agent, or Firm* — Venable LLP; Jeffri A. Kaminski (57) ABSTRACT

A system, a method and a computer program product for managing memory access of an avionics control system having at least one control computer having at least one memory control device. The method includes assigning a memory access of at least one unique memory region of at least one memory unit to each of at least one application task or task set. A memory access of at least one application data update task is assigned to at least one subregion of one or more of the at least one unique memory region. At least one data parameter is written to the at least one subregion and the assigned memory access of the at least one application data update task de-activated.

13 Claims, 4 Drawing Sheets

(51) Int. Cl.
   *A61K 38/16*  (2006.01)
   *A61K 38/22*  (2006.01)
   *C07K 14/475*  (2006.01)
   *C12Q 1/68*  (2018.01)
   *G01N 33/68*  (2006.01)
   *G06F 12/14*  (2006.01)
   *G06F 9/50*  (2006.01)
   *H04L 29/08*  (2006.01)

(58) Field of Classification Search
   CPC ........ C12Q 2600/158; C12Q 2600/178; G01N 2800/60; G01N 2800/7095; G01N 33/6893; G06F 12/1458; G06F 2212/1052; G06F 9/5016
   See application file for complete search history.

(56) References Cited

U.S. PATENT DOCUMENTS

| | | | | |
|---|---|---|---|---|
| 9,098,462 | B1* | 8/2015 | McNicholl | G06F 13/1631 |
| 2004/0199512 | A1* | 10/2004 | Cornwell | G06F 17/30362 |
| 2004/0205776 | A1* | 10/2004 | Harrington | G06F 8/67 |
| | | | | 719/320 |
| 2005/0132179 | A1* | 6/2005 | Glaum | G06F 11/1433 |
| | | | | 713/1 |
| 2007/0061807 | A1 | 3/2007 | Bibby | |
| 2008/0091300 | A1* | 4/2008 | Fletcher | G05D 1/0291 |
| | | | | 700/245 |
| 2008/0215927 | A1 | 9/2008 | Roussel | |
| 2012/0203997 | A1* | 8/2012 | Block | G01C 23/00 |
| | | | | 711/170 |
| 2013/0332926 | A1* | 12/2013 | Jakoljevic | G06F 9/45533 |
| | | | | 718/1 |

OTHER PUBLICATIONS

Jong-Seo Kim et al.; "Fieldbus Virtualization for Integrated Modular Avionics", IEEE Conference on Emerging Technologies & Factory Automation, Sep. 5-9, 2011, pp. 1-4; E-ISBN; 978-1-4577-0016-3; DOI: 10:1109/ETFA.2011, 6059151; whole document.

Stefan Berger et al.; "Towards Automatic Reconfiguration of Aviation Software Systems", 2011 35th IEEE Annual Computer Software and Applications Conference Workshops; Jul. 18-22, 2011; pp. 200-205, E-ISBN; 978-0-7695-4459, DOI: 10:1109/COMPSACW. 2011.43; whole document.

PCT/ISA/210—International Serach Report—dated Jun. 11, 2013 (Issued in PCT/SE2012/050701).

PCT/ISA/237—Written Opinion of the International Searching Authority—dated Jun. 11, 2013 (Issued in PCT/SE2012/050701).

Office Action dated Jun. 22, 2017 in European Patent Application No. 12 879 468.2.

* cited by examiner

DYNAMIC MEMORY ACCESS MANAGEMENT

CROSS-REFERENCE TO RELATED APPLICATIONS

The application is the national phase under 35 U.S.C. § 371 of PCT/SE2012/050701 filed 21 Jun. 2012.

TECHNICAL FIELD

The present invention relates to a system having functionality for managing memory access and a method for managing memory access of a computer system.

In particular the invention relates to an avionics control system having functionality for managing memory access and a method for managing memory access of an avionics control system.

Furthermore, the invention relates to software adapted to perform steps of the managing method when executed on a computer.

BACKGROUND OF THE INVENTION

In embedded control systems of today, developments in digital technology have enabled complex functionality. However as a direct result from the development, the need of additional system capacity provided by software and various components such as sensors, processors, display units, data buses and memory units is increasing.

Apart from implementing more functionality and interconnectivity in control systems, using less Space-Weight-and-Power, (SWaP) and a reduced number of cabling are further important drivers. Updates of embedded hardware and software during a products life span make adaptability and modularity another interesting design parameter. Other incentives include achieving cost efficient development, production and maintenance, where one possible route is to implement Commercial-Of-The-Shelf (COTS) technology instead of expensive specialized technology.

Real-time systems for safety critical control applications, wherein typically data from sensor/s are acquired, communicated and processed to provide a control signal to an actuator pose strict demands regarding bandwidth, data delivery time, redundancy, and integrity. Failure to meet one or several of these demands can in applications including "brake-by-wire" or "steer-by-wire" prove dangerous.

One such area wherein reliable high-speed real-time execution and communication of data is applicable is within avionics systems. Advances in technology during late 1960 and early 1970 made it necessary to share information between different avionics subsystems in order to reduce the number of Line Replaceable Units (LRU:s). A single sensor such as a position sensor provided information to weapon systems, display system, autopilot and navigation system.

The high level architecture of avionics systems has gone from federated meaning separate LRU:s for separate functions to Integrated Modular Avionics (IMA) meaning several functions integrated into multifunctional LRU:s. The connectivity allowing communication between different LRU:s has gone from low bandwidth point-to-point connections to higher bandwidth bus connections.

Guidance set out by Radio Technical Commission for Aeronautics (RTCA) in DO-178B and RTCA DO-254 regulates how to design and develop software and respective hardware in a safe way in order to show airworthiness, according to a criticality scale. However certification and subsequent recertification of software according to the DO-178B represents a substantial cost of developing software based avionic control systems.

In order to assist development of modern control systems for avionics a set of guidance documents such as RTCA DO-297 and Aeronautical Radio Inc. (ARINC) 651 defines general concepts for IMA systems. Further Draft 3 of Supplement 1 to ARINC Specification 653: *Avionics Application Software Standard Interface*, defines an Application Program Interface (API) referred to as Application Executive (APEX), implemented in Real-Time Operating Systems (RTOS) used for avionic control systems. APEX allows for space and temporal partitioning that may be used wherever multiple applications need to share a single processor and memory resource, in order to guarantee that one application cannot bring down another in the event of application failure.

Configuration of one or more ARINC 653 based RTOS for an avionics control system is typically performed by manually entering a large number of configuration data and parameters. The configuration of an IMA system and the associated applications may require a specification that is several thousand lines long. The configuration data and parameters dictate for example conditions for the space and time partitioning and data communication ports.

Apart from configuration of the one or more ARINC 653 based RTOS configuration of additional hardware components such as for example network devices and memory units and associated controllers is typically required.

Configuration of memory units and its associated controllers may for example relate to configuring one or more memory region of a memory unit to be dedicated to a particular application. Configuring the one or more memory region may for example be related defining the one or more memory region or portions thereof where each application can store and retrieve data. This is particularly important in safety critical avionic systems wherein multiple applications share the same memory unit.

However, memory configuration of today tends to be static and increase complexity related to system configuration.

Accordingly, there is a need in the art of avionics to present improvements, intended to robustly facilitate memory configuration and enhance adaptability.

OBJECTIVE OF THE INVENTION

It is therefore an objective of the present invention to provide a system, a method and a computer program performing said method, that facilitates configuration and achieve increased adaptability in regard of memory access management.

SUMMARY OF THE INVENTION

This objective is achieved according to the present invention by a method for managing memory access of an avionics control system having at least one control computer comprising at least one memory unit having a partitioning operating system and at least one application task or task set stored thereon, at least one processor arranged to orchestrate the partitioning operating system and the at least one application task or task set, at least one memory control device arranged to control memory access of the at least one processing device to the at least one memory unit. The method comprising the step of assigning each of said at least one application task or task set memory access to at least one unique memory region of said at least one memory unit. The method comprising the further step of assigning at least one application data update task memory access to at least one subregion of one or more of the at least one unique memory region. The method comprising the further steps of orchestrating said at least on application data update task in order to write at least one data parameter to the one or more of the at least one subregion, and re-configuring the at least one memory control device in order to de-activate memory access of said at least one application data update task so as to protect said at least one subregion and thereby prevent any data parameter of the one or more of the at least one subregion to be overwritten.

It is achieved that the parameters such as one or more constant used by one or more application comprising said at least one task set can be updated during initialization of the application while assuring that a proper access right is designated for the at least one memory control device such that parameters defined during the initialization phase once initialized are unable to be over-written during further operations. This provides a robustness in terms of that parameters such as one or more constant updated during initialization are protected during a normal operation state of the avionics control system.

It is further achieved that design assurance evidence for verifying properties of memory assignment to applications and the respective memory access can be provided proving compliance to standards including robust partitioning standards such as for example the ARINC 653 standard.

The method is in one option further characterized in that the at least one subregion is arranged to store one or more data parameter of constant data type used to initialize data of the at least one application task or task set during an initialization procedure of said at least one application task or task set.

The method is in one option further characterized in that the step of assigning each of said at least one application task or task set memory access, further comprises assigning at least one memory access right attribute so that each of the at least one application task or task set only has a read access to the at least one subregion of its uniquely associated memory region.

The method is in one option further characterized in that the step of assigning at least one application data update task memory access further comprises assigning at least one memory access right attribute so that each of the at least one application data update task at least have a write access to the one or more of the at least one subregion.

The method is in one option further characterized in that the at least one application data update task is stored on one or more of the at least one memory unit.

The method is in one option further characterized in that the at least one application data update task is part of one or more of the at least one application task or task set.

The method is in one option further characterized in that the at least one application data update task is a unique application task separate from any of said at least one application task or task set.

The method is in one option further characterized in that the avionics control system has a plurality of control computers coupled in a network and wherein the step of assigning at least one application data update task memory access of to a at least one subregion comprises assigning memory access to a plurality of subregions across a plurality of memory units of more than one control computer so as to provide the application data update task with the ability to write data parameters to the plurality of memory units.

The method is in one option further characterized in that the step of orchestrating the at least one application data update task is performed prior to initialization of the at least one application task or task set.

The method is in one option further characterized in that the step of orchestrating said at least on application data update task performed prior to initiating an initialization procedure of the at least one application task or task set.

The method is in one option further characterized in that the step of re-configuring the at least one memory control device is performed substantially prior to completion of an initialization procedure of the at least one application task or task set.

The method is in one option further characterized in that the at least one data parameter is related to at least one constant data type selected from a group comprising constants, mathematical expressions, system scheduling data, database contents, registers.

The method is in one option further characterized in that said partitioning operating system is an ARINC 653 compliant operating system.

The method is in one option further characterized in that the step of re-configuring the at least one memory control device comprises that the partitioning operating system orchestrates instructions associated to an API providing services to control the memory control device.

This objective is also achieved by an avionics control system having functionality for managing memory access, the avionics control system having at least one control computer comprising: at least one memory unit having a partitioning operating system and at least one application task or task set stored thereon, at least one processor arranged to orchestrate the partitioning operating system and the at least one application task or task set, at least one memory control device set to enabled mode and arranged to control memory access of the at least one processing device to the at least one memory unit. Each of the at least one application task or task set is assigned memory access of at least one unique memory region of said at least one memory unit. The at least one memory unit having at least one application data update task stored thereon. The at least one application data update task is assigned with memory access to at least one subregion of one or more of the at least one unique memory region. The at least one application data update task is arranged during orchestration to write at least one data parameter to the one or more of the at least one subregion, and wherein the at least one memory control device is arranged to de-activate memory access of said at least one application data update task, based on being re-configured so as to protect said at least one subregion and thereby prevent any data parameter of the one or more of the at least one subregion to be subsequently overwritten.

This objective is also achieved by a computer programme comprising a programme code for performing the above described method steps, when said computer programme is run on a computer.

This objective is also achieved by a computer programme product comprising a program code stored on a computer readable media for performing the above described method steps, when said computer programme is run on the computer.

This objective is also achieved by a computer programme product directly storable in an internal memory of a computer, comprising a computer programme for performing the

DETAILED DESCRIPTION

The present disclosure describes a system, method and computer program for configuring spatial protection mechanisms i.e. dedicated memory regions for software applications intended to execute on a robust partitioned embedded distributed control computer environment such as for example a robust partitioned embedded distributed control computer environment comprising a number of interconnected control computer modules compliant with ARINC 653.

The term robust partitioned is used herein to denote that the software applications are spatially and temporally partitioned arranged in order to secure access to hardware resources such as memory and processor so as to ensure that none of the software applications cannot bring down another in the event of application failure.

Configuration data or tables also known as system "blue prints" or system and partition configurations records is used to specify the configuration i.e. functionality of each control computer within the distributed control computer environment.

The configuration data or tables for defining an ARINC 653 control computer module according to Draft 3 of Supplement 1 to ARINC Specification 653: *Avionics Application Software Standard Interface* comprise seven major elements one or more Partition, a System health monitoring (HM) Table, a Module health monitoring (HM) Table, a Connection Table, one or more Partition health monitoring (HM) Tables, one or more Partition Memory element, and a Module Schedule. The Partition Memory defines the regions of memory that each partition has access to.

The software also referred to as applications comprise source code utilizing one or more functional calls/services associated to functionality provided from the embedded distributed control computer environment. The one or more functional calls/services may for example require functionality provided from one or more particular operating system and/or one or more particular API associated to the embedded distributed control computer environment.

Prior art robust partitioned control computer environments such as ARINC 653 environments which according to Draft 3 of Supplement 1 to ARINC Specification 653: *Avionics Application Software Standard Interface* states that partitions, and therefore their associated memory spaces, are defined during system configuration. There are no memory allocation services in the APEX interface. This means that in prior art partitioned control computer environments there are no means related to controlling memory access during initialization or after initialization. The term initialization is used through the description to denote a sequence of actions that brings the system or component thereof to a state of operational readiness as defined by the DO-254 standard.

Hence, the system build specification according to prior art which is defined in the system and partition configuration records which is read during system start up the i.e. before an application initialization phase together with the source code of the applications statically defines the memory areas and associated read/write rights accessible to each of the partitions along with constants and other data such as schedules, databases and mathematical expressions used by the partitions and their associated applications. This means that data such as for example constants associated to the applications needed to be updated cannot be updated during the initialization phase of the applications since the memory regions are already write protected/set to read only or the data updated during the system initialization phase cannot be protected in case access right defined during system build defines one or more partition to have write rights for one or more memory region. This means that in order to modify data such as constants of an application the application has to be re-programmed and re-compiled which is time consuming or alternatively constant data has to be left un-protected which results in non-compliance with the ARINC 653 specification.

The present invention alleviates the above mentioned problems associated to update of data during the initialization phase by means of implementing an improved dynamic spatial protection mechanism that allows data to be written to memory regions during initialization phase resulting in compliance with the ARINC 653 specification i.e. the spatial protection mechanism is able to guarantee that the updated data once written cannot be subsequently be overwritten during execution.

The following examples relates to the case where the distributed control system is described with reference to aerial vehicles. However, various different applications are possible, e.g. for use in land, sea or space vehicles.

The person skilled in the art will recognize that any computer system or systems that comprises suitable programming and/or processing means for operating in accordance with the disclosed method falls within the scope of the present invention. The suitable programming means may comprise any means for controlling a computer system to cause the computer system to execute the steps associated to the inventive method. The suitable programming means may for example comprise a processing unit or logic circuits coupled to a computer memory or electronic circuits which have the ability to store data such as for example machine readable instructions and/or program instructions. The computer memory being arranged to store the machine readable instructions and/or the program instructions for execution by a processing unit such as for example the processing means. The present invention may also in one example be performed by means of a computer program product, such as a ROM (Read only memory), for example a CD-ROM, DVD, semiconductor ROM or other suitable recordable medium capable of storing machine readable instructions for use in any suitable data processing system. Thus, any computer system comprising means for performing the steps of the method of the present invention stored on the computer program product is capable of executing said steps.

The person skilled in the art will also understand that apart from implementing the method of the present invention in any computer system the present invention can as well be implemented as separate hardware components, a single hardware component or firmware or any combination thereof.

Figure 1:
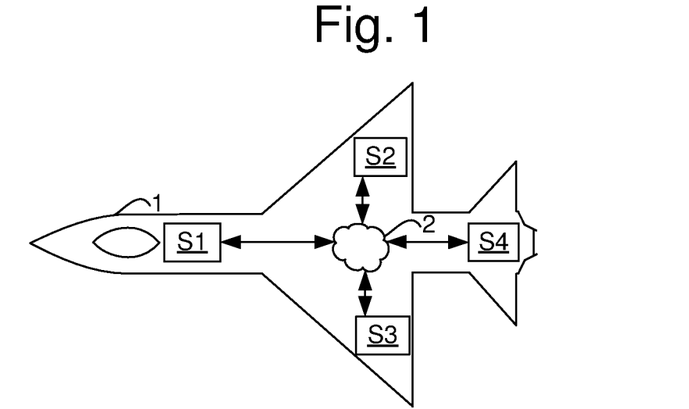
FIG. 1. shows schematically a distributed avionics system in accordance with an example of the invention.

Referring to the drawings, and initially to FIG. 1, there is illustrated a distributed avionics computer system to be configured according to an example of the present invention. The distributed avionics computer system may comprise a distributed avionics computer system comprising a plurality of avionics computers S1-S4 arranged to be mounted in various locations of an aerial vehicle 1 and act as controller of one or more of a set of subsystems of the aerial vehicle 1, such as for example act as a controller of a fuel injection system or hydraulics of an aileron.

Figure 2:
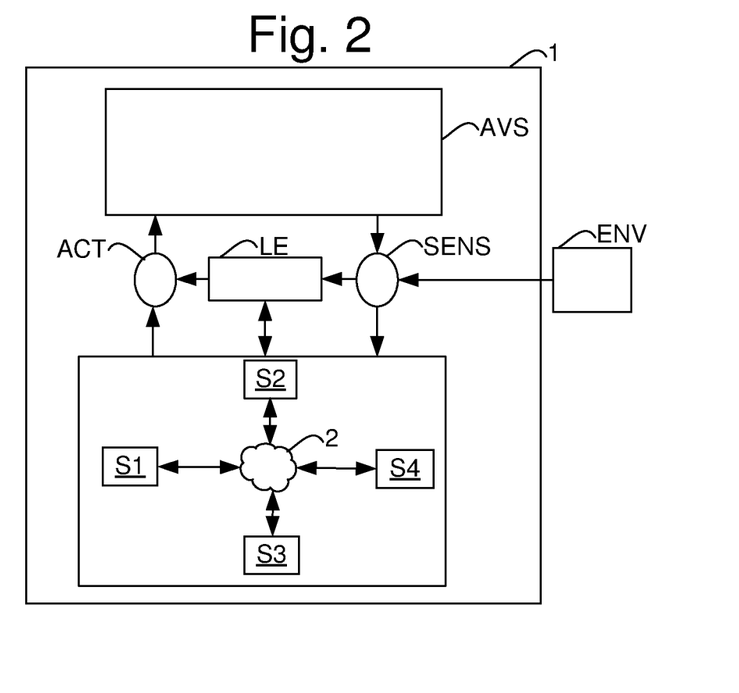
FIG. 2. shows schematically the distributed avionics system integrated to components of an aerial vehicle in accordance with an example of the invention.

In FIG. 2 there is illustrated an alternative view of the distributed avionics computer system integrated into systems/components of the aerial vehicle 1 in accordance with an example of the invention. The set of subsystems of the aerial vehicle AVS may comprise systems such as for example ailerons, flaps, fuel injection and payload. The distributed avionics computer system may comprise at least one computer node S1-S4, such as a general purpose computer arranged as a flight control computer (FCC) and/or a mission control computer (MCC), arranged to be in communicative connection with various of the set of subsystems of the aerial vehicle AVS and additional systems and/or components such as sensors SENS, actuators ACT and one or more control stations. The sensors SENS may provide information related to properties of various of the set of subsystems of the aerial vehicle AVS and of an operating environment ENV surrounding the aerial vehicle 1. The one or more control stations may provide information related to interactions from one or more operators of the aerial vehicle 1. The distributed avionics computing system may be arranged to process the information provided from one or more of the sensors SENS and/or control stations, in order to provide control data to the one or more actuators ACT and/or presentation data to the control stations. The distributed avionics computer system may be coupled to at least one legacy avionics processing component LE, such as for example a legacy LRU arranged as a radar processing unit, arranged to be in communicative connection with the various avionics subsystems AVS and additional systems and/or components such as sensors SENS, actuators ACT and the one or more control stations.

Figure 3:
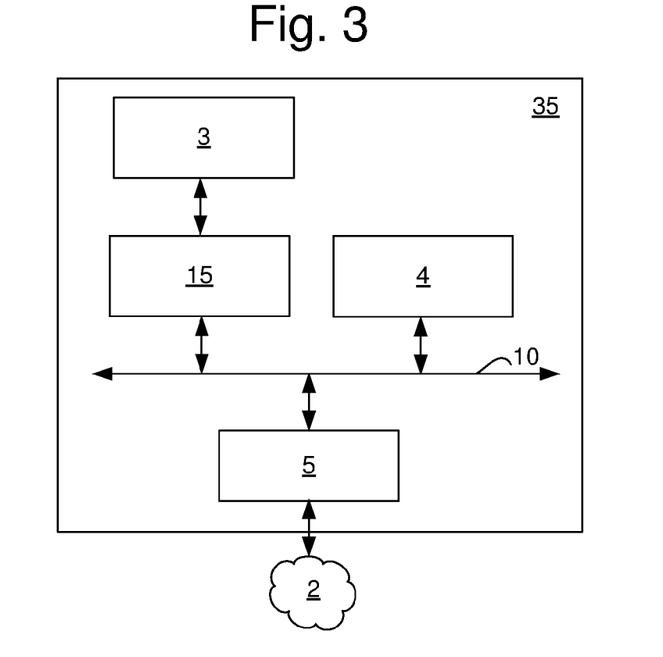
FIG. 3. shows a schematic block diagram of hardware components of the distributed avionics system in accordance with an example of the invention.

With reference to FIG. 3 the hardware configuration 35 of one of the plurality of computers S1 is illustrated in accordance with an example of the invention. Each of the plurality of computers S1-S4, hereinafter referred to as nodes S1-S4, may comprise at least a processor 3, memory 4, hardware clock (not shown), power supply (not shown), I/O interface 5, at least one communication medium 10 and at least one memory management unit (MMU) 15 or paged memory management unit (PMMU) 15. The at least one processor may for example be a microprocessor, programmable device, Field Programmable Gate Array (FPGA) or any other processing device known within the art. The at least one memory 3 may be a Random Access Memory (RAM) and/or a non-volatile memory such as a Read Only Memory (ROM), optical disc drive, magnetic disc drive, flash memory, Electrically Erasable Read Only Memory (EEPROM), Synchronous Dynamic Random Access Memory (SDRAM), Static RAM (SRAM), Double Data (DDR) RAM, RAMBUS Dynamic RAM (RDRAM) or any combination thereof. The at least one memory 4 may comprise instructions to enable the at least one processor 3 to provide services enabling the inventive methods according to examples of the present invention. The at least one communication medium 10 may comprise one or more buses, bridges and controllers typically found in modern computer systems. The at least one memory management unit (MMU) 15 is arranged to control accesses to the at least one memory 4 requested by the at least one processor 3 based on providing one or more of the following functionalities translation of virtual addresses to physical addresses i.e. virtual memory management, memory protection, cache control, bus arbitration or bank switching. The I/O interface 5 may be arranged to provide access to system peripherals e.g. devices coupled to the respective node by means of VME, PCIe or the like. The distributed system may further comprise at least one network 2, such as for example a switched Ethernet network, operatively connecting the nodes S1-S4, thereby enabling exchange of data messages between the nodes. Access to the network may be provided by the respective I/O interface 5 which may be arranged to place data messages to and/or retrieve data messages from the network 2 in accordance with predetermined instructions. The I/O interface 5 may further be arranged to provide access by means of one or more additional connections to other devices such as remote data concentrators (RDC:s), sensors and/or actuators. The one or more connections to the other devices may be point-to-point connections such as RS-422 or of bus type such as MIL-STD-1553, IEEE 1394, or other similar type of connection known within the art.

In one example the at least one MMU 15 is an integrated part of the at least one processor 3.

It is to be noted that the hardware configuration 35 of each of the plurality of computers may be configured differently than the illustrated example with reference to FIG. 3. As an example the configuration may comprise one or more additional components such as for example an input/output memory management unit (IOMMU) arranged to control accesses to the at least one memory 4 requested by I/O interface 5, one or more memory bus, at least one cache memory arranged to temporally store at least a portion of the information stored on the at least one memory 4 or other additional components known within the art.

Figure 4:
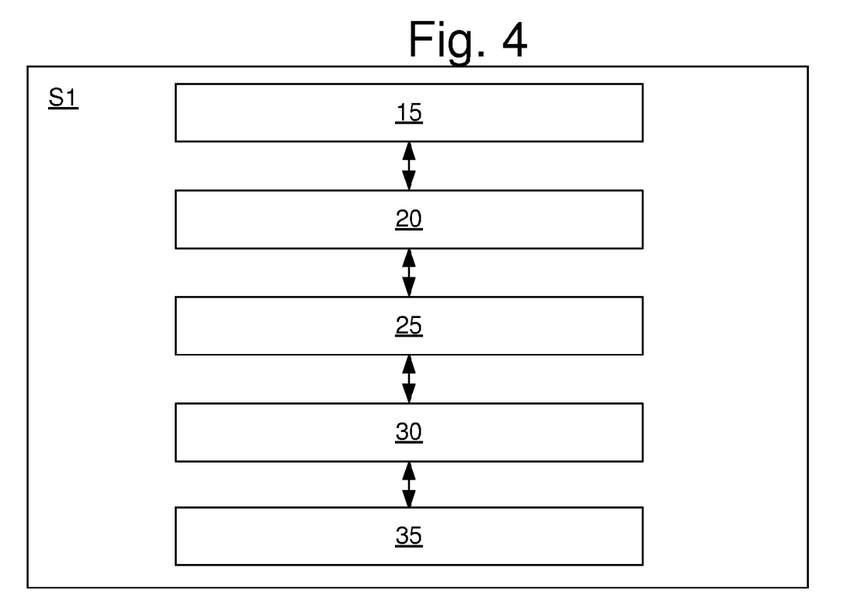
FIG. 4. illustrates a schematic representation of the hardware components and software in accordance with an example of the invention.

In FIG. 4 the configuration relating to the high level architecture of one of each of the plurality of computers S1 to be configured is illustrated in accordance with an example of the invention. Each node S1-S4 may apart from the above described hardware 35 with reference to FIG. 2 comprise a hardware interface system 30, arranged to by means of a set of interface drivers to provide access to specific hardware such as the memory 3 and the hardware clock. Each node S1-S4 may further comprise at least one operating system 25 also referred to as a module operating system (MOS) such as a real-time partitioning operating system (RTOS) such as for example an ARINC 653 compliant operating system. Other suitable partitioning operating systems such as non-ARINC 653 compliant operating systems are known to the person skilled in the art and can be used in other examples. The operating system may be arranged to provide a number of services to one or more avionics application and/or one or more system application. The number of services may relate to communication, scheduling, memory management, timing and health monitoring, such as providing local system time and timer services. In providing the services the operating system may be arranged to interact with the hardware 35 by means of the hardware interface system 30.

Each of the one or more avionics application to be deployed into the distributed avionics computer system may comprise one or more avionics application task or task set, also referred to as processes. Each of the one or more tasks may denote a logical unit of computation with a single thread of control. As an example an avionics application may be arranged to process sensor readings and control commands provided by an operator by means of one or more control laws, to continuously provide a control signal to an actuator, such as to an actuator associated to an aileron. As an example one of the tasks may be configured to perform a derivative operation on a first data variable retrieved from a sensor at time t. As a further example one of the tasks may be configured to perform a computation at time t and t+1 to provide a second data variable relating to a velocity of an object at time t and t+1 given a first data variable associated to the acceleration of the object at time t and t+1.

In one example each node S1-S4 may be arranged to execute a partitioned real-time operative system RTOS, compliant with ARINC 653, to allow for spatial and temporal partitioning of the set of applications comprised in an integrated modular avionics IMA partitioning module 15. With further reference to FIG. 4 the IMA partitioning module 15 may comprise one or more partitioned avionics application and/or system application such as for example a first avionics application, a second avionics application and a first system application. Each of the applications may be divided in the IMA module 15 into one or more partitions such as for example a first partition associated to the first avionics application and the second avionics application and a second partition associated to the first system application. Each of the applications may further comprise one or more tasks. As an example a first task may be associated to the first application, a second task and a third task may be associated to the second application and a fourth task and fifth task may be associated to the third application. The one or more node S1-S4 may further each comprise an abstraction layer provided by an application programming interface (API) 20 located between application software in the IMA partitioning module and operative system OS. The API 20 may be arranged to provide a set of basic services to the set of applications required for performing their respective tasks and in order to communicate.

In one the example the API may be arranged as an application executive APEX, conforming to the ARINC 653 specifications. The implementation of the ARINC 653 specifications, for high level IMA architecture prevents error propagation when running different applications on a single processor. The partitioning enables to run applications certified to different criticality level measured by Design Assurance Level (DAL) according to the RTCA DO-178B on a single processor.

Figure 5:
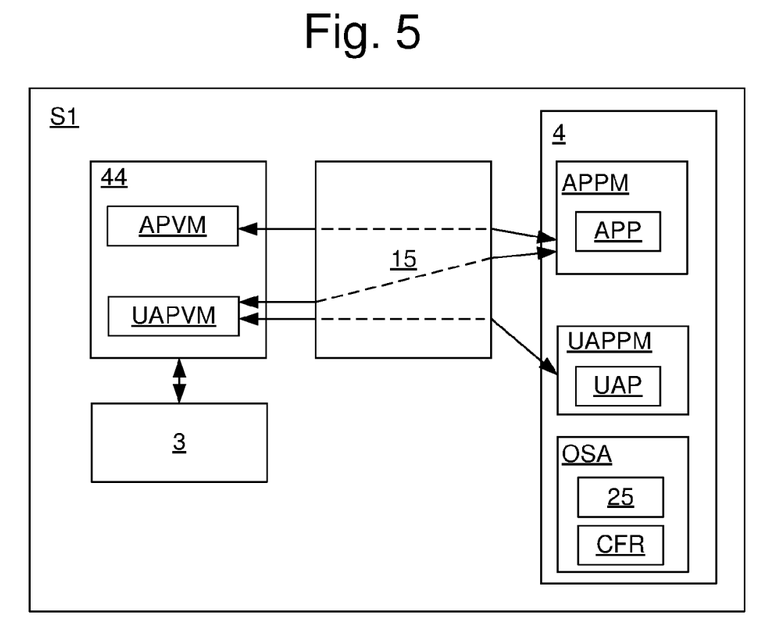
FIG. 5. illustrates a schematic representation of the operations of the configurable memory controller and software in accordance with an example of the invention.

With reference to FIG. 5 the combined hardware and software configuration of one node S1 of the plurality of nodes S1-S4 is illustrated in more detail in accordance with an example of the invention.

The node S1 is arranged to execute the one or more avionics application each comprising one or more application task or task set partitioned into at least one avionics application partition APP in combination with at least one operating system 25 such as a module operating system (module OS). The setup of the node S1 is arranged to be configured by a system and a partition configuration record CFR determining the configuration of the node S1. The system and partition configuration record is used during system setup for system configuration and during orchestration for dictating for example scheduling of processing power and communication. The system and partition configuration record may comprise configuration data specifying for example available hardware, module OS configuration parameters, number and identity of system applications arranged to be executed by the node, groupings of system applications into avionics application partitions, amount of memory assigned to each application and/or avionics application partition, scheduling of processing power assigned to each application or partition and scheduling of communication bandwidth. In this example the node S1 is further arranged to execute at least one application data update task UAP. The at least one application data update task is arranged to perform updates of selected portions of at least the one or more avionics application.

In one example the selected parts of the one or more avionics application comprises the portions arranged to hold constant data to be used by the one or more avionics application.

Implementing partitioning functionality comprises apart from temporal resource scheduling also comprises spatial protection i.e. protection of each partitions memory addressing space to be provided by a memory protection mechanism such as for example provided by the at least one MMU 15. Spatial partitioning defines the isolation requirements for multiple applications running concurrently on the same node. That is one or more partitioned avionics application task or task set running in a application partition must not be able to deprive an avionics application task or task set of another application partition of shared application resources or those resources provided by at least one partitioning RTOS kernel being part of the at least one operating system 25 arranged to be orchestrated on the node.

In order to implement spatial protection the at least one MMU 15 of the node S1 is arranged to manage memory access. In more detail the at least one MMU is arranged to manage memory access from the at least one processor 3 to the at least one memory unit 4 i.e. physical memory. The at least one MMU is arranged to manage memory access by means of implementing a memory address protection scheme so as to prevent each individual application or such as an avionics application, system application, avionics application partition or one or more task thereof to inadvertently affect data of other applications.

In one example the memory address protection scheme is arranged to be implemented by means of a virtual memory arrangement 44. The virtual memory arrangement is arranged to provide an additional memory context apart from the physical memory context provided by the at least one memory unit 4. In this example the additional memory context is a virtual memory context or space comprising a range of virtual memory addresses and/or memory regions. This virtual memory context is used by the at least one MMU to control memory access requests from the processor arranged to execute the one or more partitioned avionics application to the at least one physical memory unit 4. In more detail each of the at least one avionics application partition and the module OS is assigned its own predetermined private or predetermined unique memory region and/or regions of the at least one memory unit 4. The predetermined unique memory region or regions are physical memory region or regions and may be located anywhere in the at least one memory unit 4. The memory addresses and/or memory regions used within the one or more avionics applications of the at least one avionics application partition are virtual memory addresses and/or regions, which are translated by the at least one MMU at run time i.e. upon execution by the at least one processor 3 in order to indicate the real memory locations referring to the memory addresses or regions of the memory unit 4. The translations from virtual to physical memory regions are private to a process, meaning that only the process of the particular avionics application partition or module OS that owns the memory locations i.e. physical memory region or regions can access them. This insures that each process can only see and change the memory region or regions of its associated partition, and therefore cannot damage the physical memory owned by another partition. The at least one MMU translates the virtual addresses into physical addresses. In case an avionics application partition or process associated to said application partition attempts to address a memory region that is not currently mapped to it, the MMU generates an exception. The exception sends a signal to the offending thread of the application partition in which the default action is to terminate the process. Alternatively, the thread may catch the signal for alternative user-defined actions. Hence, each avionics application partition can only access the logical address space i.e. physical memory region that is mapped by the MMU which makes careless malicious corruption across the processes of different criticality levels impossible. That is when an application executes it is given its very own virtual address space, which is a block of virtual memory addresses. The start and end of this address space is not necessarily the same as how it is actually stored in the physical address space in the memory 4.

In one example the memory address protection scheme is arranged such that translations from virtual to physical memory regions are private to each of the at least one avionics application partition, meaning that only the one or more process or thread of the particular avionics application partition or module OS that owns the memory locations i.e. physical memory region or regions can access them.

The predetermined unique memory region or regions associated to each of the avionics application partition or module OS may each vary in size. The size of each individual predetermined unique memory region for each avionics application partition may be identified based upon the requirements of the individual partitions and the available system resources. Typically, a system integrator is responsible for assigning suitable memory resources to each application partition which is specified in the partition configuration record. Each application developers are then bound by said assigned memory resources when designing individual avionics applications.

In one example in case the node such as for example the node S1 comprises at least one cache memory such as for example L1 and/or L2 cache memory then memory access requests from executing applications are transmitted to the at least one MMU 15 and the at least one cache memory. Should the requested data be present in the at least one cache memory then the at least one processor will utilize the data provided by the at least one cache memory otherwise the at least one processor will utilize the translated physical address provided by the at least one MMU 15 in order to retrieve data from a corresponding memory region of the memory 4.

In one example depending on selected computer architecture block address translation (BAT) registers may be arranged for translating regions of memory from logical memory regions i.e. virtual memory regions to equivalent sized memory regions of the physical memory.

In one example the at least one MMU is arranged to utilize a translation Lookaside Buffer (TLB) cache memory (not shown), in order to speed up virtual-to-physical address translation. In more detail the at least one MMU divide the virtual address space (the range of addresses used by the processor) into pages, each having a size which is a power of 2. The at least one MMU translates virtual page numbers to physical page numbers via an associative cache memory called a Translation Lookaside Buffer (TLB). The data found in such data structures are typically called page table entries (PTEs), and the data structure itself is typically called a page table. The physical page number is combined with the page offset to give the complete physical address.

In one example a software assisted table walk may be implemented in order to find the correct PTE in the page table. In this example registers referred to as shadow registers may be implemented in order to minimize system load for performing translation lookup.

Installing the one or more avionics applications, the at least one module OS and other IMA related applications such as system application or system applications on the node S1 requires the use of a data loader. Software comprising the above mentioned applications and module OS to be loaded is first transferred from a memory transport medium such as a secondary storage on which the software is stored into nonvolatile memory and the transfer confirmed. When the system is started, the software and data are transferred from nonvolatile memory to the virtual memory space of the node S1. This typically requires copying the data to the at least one memory unit 4. The transfer of code and data must be correct and confirmed.

During a load procedure of the node S1 a runtime linker/loader or other suitable loading mechanism is arranged to locate system data comprising for example the module operating system, the one or more avionics application task or task set and the system and partition configuration record stored in the secondary storage. Upon locating the system data the runtime linker/loader is arranged to install i.e. store the system data on the at least one memory 4 of the node S1. The secondary storage may be a flash memory, network attached storage, CD-ROM, DVD-ROM or other suitable storage media known in the art. System data may be stored in the secondary storage in a binary format or other suitable format readable by the runtime linker/loader.

The following steps describe a schematic overview of startup/initialization procedures steps for the nodes S1-S4 of the distributed avionics computer system.

Step 1. At system initialization, boot code also referred to as boot loader loads the module OS and system and partition configuration records i.e. build specification. The system and partition configuration record resides as a record in a portion of the module's memory unit. It is read by the module OS at boot time and at run-time to configure the module. The system and partition configuration record may be built as a separate binary file, independent from other software components of the module. This means that memory and resource information must be given in the configuration file for the module and that resources are preallocated for each application, shared library and shared data region.

Step 2. The module OS initializes itself, starting its own subsystems.

Step 3. The module OS loads the at least one avionics application partition and their associated one or more avionics application task or task set and the at least one application data update task into respective memory regions of the at least one memory unit 4 as determined by the partition configuration record. That is memory allocation for the module OS, the at least one avionics application partition and the at least one avionics application data update task is defined during configuration and initialized during startup.

The module OS of the node S1 starts the at least one avionics application partition when it enters operational mode. The resources used by each avionics application partition such as for example channels, processes, queues, semaphores, blackboards, events, etc. are specified at system build time. The corresponding objects are created and initialized during initialization phase of the operational mode, and then the avionics application partitions enter run-time mode also referred to as NORMAL mode.

An application such as for the one or more application task or task set of the at least one avionics application partition typically comprises different types of data such as for example executable instructions, also referred to as text, initial values to be used in variables, also referred to as data, values for constants, also referred to as read-only data and an empty area prepared for the automatic, temporarily uninitialized, variables, also referred to as bss.

Values for constants may be initialized during the initialization phase after objects are created using a pointer or reference to read-only data such as for example data from a file system and/or data from one or more symbol reference table, symbol resolution table, jump table, hash table, database, list, XML-file or other suitable data component known in the art for holding constant data used for initializing data constants to be used during execution of the one or more application task or task set. The values of the constants may be provided as part of software code for the one or more avionics application task or task set.

Apart from the at least one predetermined unique memory regions or pages allocated to each of the avionics application partitions portions of the unique memory regions hereinafter referred to as memory subregions may be allocated within each of the unique memory region of each of the at least one avionics application partition. The memory subregions for each of the at least one avionics application partition may be allocated to one or more of the above mentioned different types of data for each of the one or more application task or task sets. That is each of the at least one avionics application partition is provided with at least one predetermined unique memory region defining the bounds of its operations related to physical memory. Each of the at least one predetermined unique memory region allocated to each of the at least one avionics application partition may further be divided into one or more memory subregions for holding the different types of data of the one or more application task or task set residing in each of said at least one avionics application partition. Memory access to each of the one or more memory subregions may be combined with a memory access right protection attribute determining what types of operations are granted within the respective memory subregions. Available access right protection attribute include but are not limited to execute-only, read-only for memory subregions and write-only. In case more than one software component such as more than one avionics application, avionics application task or task set or avionics application partition are assigned with memory access to one and the same memory subregion memory access protection attributes may be set up differently for each of the one or more software component assigned with memory access to the one and same memory subregion. As an example a particular avionics application partition may be configured to have memory access to a particular memory subregion with memory access right protection attribute read-only and another avionics application partition may be configured to have memory access to this particular memory subregion with memory access right protection attribute write-only.

In order for the memory access or memory accesses assigned for the at least one avionics application partition to the at least memory region and it's associated one or more memory subregion to be enforced by the at least one MMU the at least one MMU need to be configured. This may be performed providing configuration information to the at least one MMU such as for example configuration in the form of memory address translation tables with associated memory access right protection attributes.

Each of the at least one avionics application partition has at least one predetermined unique memory region allocated to it. The at least one predetermined unique memory regions for the at least one avionics application partition is identified based upon the requirements of the individual avionics application partition or partitions, and may vary in size and access rights as specified during design/build of the distributed avionics computer system, associated module OS or OS:es, avionics applications and associated avionics application partitions.

Memory partitioning is ensured by the at least one MMU prohibiting memory accesses outside of each of the at least one application partition's predetermined unique memory regions and enforcing protection inside of each of the application partition's predefined memory regions with respect to enforcing the predetermined access right protection attributes for each of the associated memory subregions.

Memory access and associated memory access right protection attributes assigned to the at least one avionics application partition are arranged to be enforced by the at least one MMU after the at least one MMU has been configured and set to enabled mode. This means that only the one or more avionics application task or task sets residing inside the avionics application partition and additional one or more task or task set assigned with memory access to the predetermined unique memory region or portions thereof are allowed to orchestrate one or more of the following operations execute, read or write operations within this predetermined unique memory region designated for the at least one avionics application partition by means of the MMU enforcement. The additional one or more task or task set assigned with memory access to the predetermined unique memory region or portions thereof may as an example be the at least one application data update task.

The at least one MMU is arranged to start to enforce memory protection of each of the predetermined memory regions as soon as the application partition and/or module OS are loaded into the respective predetermined memory regions i.e. before initialization and execution. That is after the module OS and its associated components such as the configuration records are loaded to its predetermined memory regions memory protection is set up for the loaded module OS and its associated components and after each of the application partitions are loaded protection is set up for the respective predetermined unique memory regions associated to each of the application partitions.

As an example with further reference to FIG. 5 at the beginning of the setup phase of at least one of the nodes S1-S4 a first avionics application partition APP may be configured with memory access to at least one first predetermined unique memory region APPM of the at least one memory unit 4. The at least one first predetermined unique memory region to which the first avionics application partition is provided with access may by means of configuration be divided into a at least one memory subregion (not shown)

located within said at least one first unique predetermined memory region. Each of said at least one memory subregion being configured with a suitable memory access right attribute determining what type of access is granted for the first avionics application partition and its associated at least one avionics application task or task set within each of the memory subregion such as for example execute-only for memory subregions holding executable code, read-only for memory subregions holding constant data and write for memory subregions holding variables. In this example the at least one application data update task UAP may be configured during the beginning of the setup phase with memory access to at least one second predetermined memory region UAPPM arranged to store data used by the at least one application data update task. The at least one application data update task is further provided with access to one or more of the at least one memory subregion i.e. one or more portion of the at least one first predetermined unique memory region APPM associated to the first avionics application partition. The one or more of the at least one memory subregion of the first predetermined unique memory region to which the at least one application data update task is provided with access may be one or more memory subregions holding constant data to be used by the the at least one avionics application task or task set associated to the at least one first avionics application partition. The memory access right attribute associated with the memory access for the at least one application data update task to the one or more memory subregion of the first predetermined memory region may be set to write-only for the at least one application data update task. That is the at least one application data update task is allowed to write data to the one or more of the at least one memory subregion arranged to hold constant data associated to the first avionics application partition.

In one example memory access for the at least one avionics application partition to the one or more memory subregion of the at least one predetermined unique memory region arranged to hold data constants associated to at least one avionics application partition is preconfigured with a read-only memory access right protection attribute. That is the avionics application partition when executed is only allowed to perform read operations within the one or more memory subregion arranged to hold constant data.

In one example at the beginning of the setup phase of at least one of the nodes S1-S4 the at least one application data update task UAP is assigned with memory access to one or more of the at least one memory subregion of a plurality of predetermined unique memory regions associated to a plurality of avionics application partitions. That is the at least one application data update task is allowed to write data to the one or more of the at least one memory subregion arranged to hold constant data associated to the plurality of avionics application partitions.

Since the at least one application data update task can be configured as a software component separate from other software components associated to each of the nodes S1-S4, it can be certified separately.

In one example the at least one application data update task is part of one or more of the at least one avionics application partition, the one or more avionics application of the avionics application partition or avionics application task or task set.

In one example the at least one avionics application data update task is provided as a software component separate from the at least one avionics application partition, the one or more avionics application of the avionics application partition or the one or more avionics application task or task set. As an example the at least one application data update task may be configured as a separate partition dedicated for performing updates.

In one example the at least one application data update task is stored on the at least one memory unit 4 of a single node and arranged to perform updates of one or more constant data associated to at least one application task or task set stored on more than one node. That is the at least one application data update task is enabled to remotely from the node in which the application data update task reside perform updates of constant data by accessing the nodes by for example using the network 2 for communicating updated constant data to be written.

In one example the at least one application data update task is assigned with at least write-only memory access to the subregion. In this example the at least one application data update task may apart from write access also be provided with read access to the memory subregion. That is the at least one application data update task is enabled to read data from the one or more memory subregion to which access has been provided in order to compare data currently stored data with updated data accessible to the at least one application data update task and based on found discrepancies determine if one or more update of the currently stored data is desired.

In one example the at least one application data update task is arranged to check for updated constant data from one or more source such as for example updated data residing in the at least one application data update task or updated data from one or more external source such as at least one memory unit or one or more memory regions of the at least one memory unit accessible to the at least one application data update task. In this example the at least one memory unit used as source for updated data and accessible to the at least one application data update task may be the at least one memory unit 4 or at least one memory unit separate from the memory unit 4 associated to each of the nodes.

In case no updated constant data are detected the at least one application data update task is in one example arranged to be inactivated and perform no further operations on the one or more memory subregion or to write default parameters to one or more of the one or more memory subregion. The default parameters may as an example be default parameters specified in the build specification or default parameters from a different source such as data stored on a memory location made accessible to the at least one application data update task.

In one example the constants used by at least one application of at least one application partition to be updated comprise one or more parameters selected from a group comprising mathematical expressions, system scheduling data, input/output registry data, database contents or other suitable parameters or components desired to be non-editable during active operation i.e. orchestration.

It is to be noted that each of the nodes S1-S4 can be configured and setup in a similar fashion to the above described configuration and setup of the node S1 as described with reference to FIG. 5. Each of the nodes S1-S4 may further comprise additional components other than described with reference to FIG. 5 such as for example additional components described with reference to FIG. 3.

Figure 6:
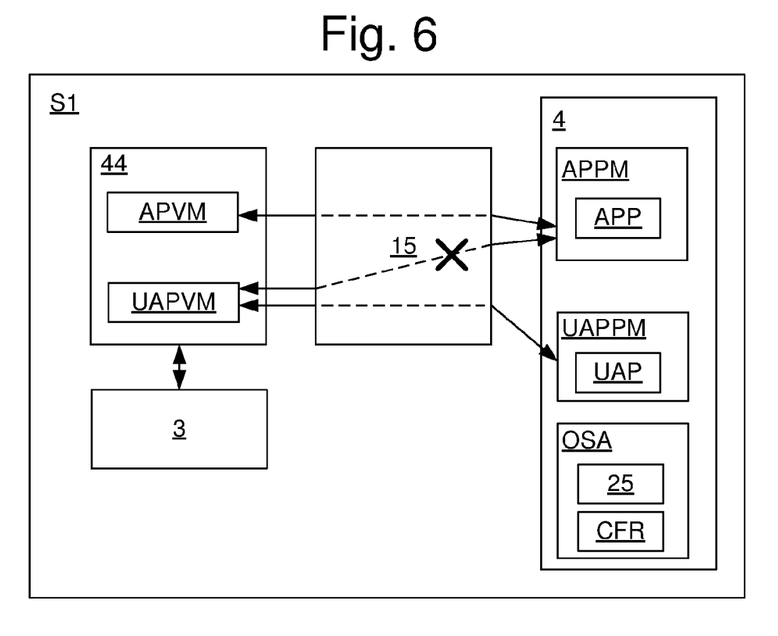
FIG. 6. illustrates a schematic representation of the operations of the configurable memory controller and software in accordance with an example of the invention.

With reference to FIG. 6 the combined hardware and software configuration 35 of one node S1 of the plurality of nodes S1-S4 is illustrated in more detail in accordance with an example of the invention.

After the process arranged to perform a setup of the node S1 has been performed or during the final stages of the setup and after the at least one application data update task has been orchestrated in order to perform updates of constant data of one or more avionics applications partition as described with reference to for example FIG. 5 the memory access for the at least one application data update task to one or more of the at least one memory subregion of the at least one predetermined unique memory region of the one or more avionics applications partition is arranged to be de-activated.

In one example once the at least one application data update task has performed zero or more updates of the data constants the application data update task and/or the module OS may be arranged to invoke instructions arranged to drop i.e. de-activate memory access for the at least one application data update task to the at least one memory subregion of the first avionics application partition. That is the at least one application data update task is no longer provided with memory access to the one or more memory subregions of the at least one first predetermined memory region APPM i.e. the at least one application data update task is no longer allowed to perform any operation within any portion of the at least one first predetermined memory region. That is in case the at least one application data update task tries to request memory access after the memory access for the at least one application data update task to one or more memory subregions of the at least one first predetermined memory region associated to the first avionics application partition has been de-activated resulting in that all such requested memory access request from the at least one application data update task are denied by the at least one MMU. This means that a request for memory access from the at least one application data update task to the at least one first predetermined memory region APPM will result in that the MMU generates an exception as indicated by a cross in FIG. 6. In this example in case the at least one application data update task during the setup phase is assigned with memory access to one or more memory subregions of the at least one predetermined unique memory region of a plurality of avionics applications partition all of these memory accesses are de-activated once the at least one application data update task has performed zero or more updates.

In one example the memory access is de-activated before the avionics application partition and/or associated avionics application task or task set of one or more nodes S1-S4 enters active operation such as before example before NORMAL mode operations.

In one example the memory access for the at least one application data update task to the one or more of the at least one memory subregion of the at least one predetermined unique memory region of the one or more avionics applications partition may be re-activated in response to performing a new setup phase such as for example resulting from a re-boot or reset of one or more of the nodes S1-S4.

Using the described scheme with reference to for example FIG. 5 and FIG. 6 for manipulating pre-configured memory access allows for a controlled update mechanism of constants or other data used by one or more of the at least one avionics application task or task set within the application partitions without compromising security with respect to assuring that updated constant data can be protected from being over-written during active operation of the distributed avionics computer system i.e. NORMAL mode. One restriction with regard to the scheme for manipulating or controlling the pre-configured memory access described with reference to for example FIG. 5 and FIG. 6 is that scheme is only allowed to operate manipulation of one or more memory access of allocated memory regions and/or subregions as specified in the partition configuration records i.e. build specification. That is the only allowed operations relating to modifying memory access and/or related attributes are de-activation of previously assigned memory access and/or related attributes as defined by the partition configuration records. In more detail examples of operations that are not allowed is assigning additional memory access right not being part of the partition configuration records. This means that the principles of robust memory partitioning according to for example the ARINC 653 specification can be guaranteed.

In one example with further reference to for example FIG. 5 and/or FIG. 6 an additional API (Application programming Interface) is provided. The additional API is arranged to provide additional services to the module OS related to during its operation controlling the memory access and/or memory access right attributes associated to each of the at least one avionics application partition via re-configuration of the MMU 15 in order to perform controllable modifications of the predefined memory access associated to one or more of the at least one avionics application partition during the setup phase. In this example the additional API is arranged to provide services related to controlling memory protection i.e. memory access such that previously activated memory access relating to write-only access to certain predetermined memory subregions are de-activated entirely.

In one example the additional API is arranged to de-activate memory access for the at least one application data update task to the one or more memory subregions designated to hold data constants.

In one example the additional API is arranged to provide services related to de-activating memory access to the one or more memory subregion substantially directly after constants are stored to said one or more memory subregion during the system initialization process.

In one example one or more of the at least one avionics application partition, the at least one application data update task and the module OS is provided with instructions arranged to invoke at least one function arranged to use the services provided by the additional API.

In one example the at least one additional API is only arranged to perform operation on one or more memory region and/or memory subregion private to an individual avionics application partitions i.e. one or more memory region and/or memory subregion uniquely assigned to an individual avionics application partition. That is the at least one additional API is not arranged to perform operation on memory regions and/or memory subregions shared between a plurality of avionics application partitions.

In case the at least one application data update task determines that no updates of data associated to the one or more memory subregions are necessary the additional API may in one example be arranged to de-activate memory access. In this example the additional API may either be arranged to de-activate memory access to the one or more memory subregions individually in a sequence determined from the order in which the at least one application data update task checks each of the one or more memory subregions for needed updates or de-activate memory access entirely for each of the one or more memory subregions after the at least one application data update task has checked each of the one or more memory subregions for needed updates.

In one example the additional API is arranged to allow de-activation of memory access associated to one or more memory subregion only once for each memory subregion.

In one example the additional API arranged to provide services to the module operating system related to controlling the memory access rights is provided as an additional service to the services provided by the APEX API as defined in the ARINC 653 specification.

Figure 7:
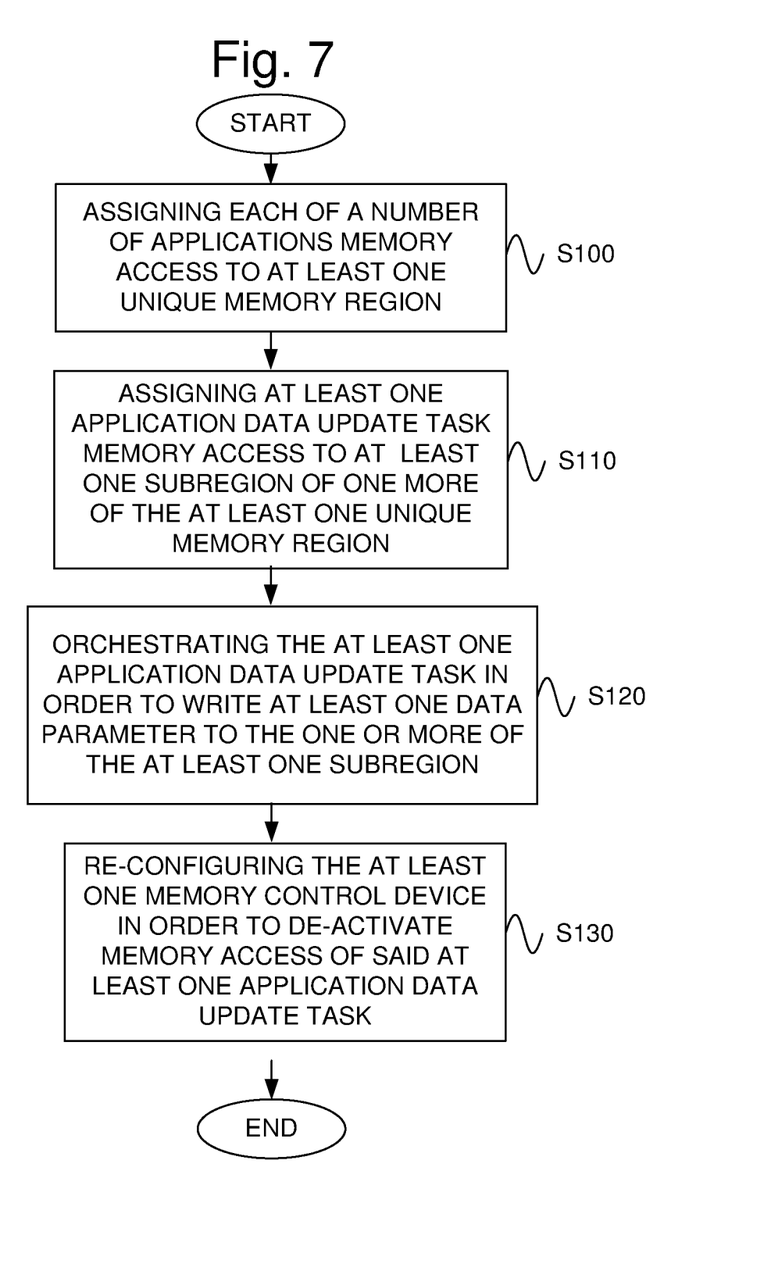
FIG. 7. shows a schematic illustration of a flow diagram for a method for configuration of a memory control device in accordance with an example of the invention.

FIG. 7 schematically illustrates a flow diagram of a method according to an example of the present invention. This example relates to managing memory access of an avionics control system such as for example a distributed avionics control system comprising a plurality of processing nodes S1-S4 interconnected in a network 2.

In a first method step S100 each of said at least one application task or task set APP of each of the at least one avionics application partition is assigned with memory access to at least one predetermined unique memory region APPM of said at least one memory unit 4. In more detail each of the at least one application task or task set may be assigned memory access to at least one predetermined unique memory region in accordance with predetermined information such as for example memory configuration tables also referred to as memory addressing tables being part configuration records CFR stored on the memory unit. After the method step S100 a subsequent method step S110 is performed.

In the method step S110 at least one application data update task UAP is assigned memory access to at least one subregion of one or more of the at least one predetermined unique memory region. That is the at least one application data update task is assigned with memory access to the at least one memory subregion of one or more of the at least one predetermined unique memory region wherein the at least one memory subregion is arranged to hold constant data to be used by the at least one avionics applications task or task set. After the method step S110 a subsequent method step S120 is performed.

In the method step S120 the at least one application data update task is orchestrated. In more detail the at least one application data update task is orchestrated in order to write at least one data parameter to the one or more of the at least one memory subregion. After the method step S120 a subsequent method step S130 is performed.

In the method step S130 the at least one memory control device is re-configured. In more detail the at least one memory control device is re-configured in order to de-activate memory access of said at least one application data update task so as to protect said at least one memory subregion and thereby prevent any data parameter of the one or more of the at least one subregion to be overwritten. After the method step S130 the method may end or be repeated for example resulting from a re-boot procedure being applied.

In one example the step 100 of assigning each of said at least one application task or task set memory access, further comprises assigning at least one memory access right attribute so that each of the at least one application task or task set only has a read access to the at least one subregion of its uniquely associated memory region.

In one example the step 110 of assigning at least one application data update task memory access further comprises assigning at least one memory access right attribute so that each of the at least one application data update task at least have a write access to the one or more of the at least one subregion.

In one example the step of assigning at least one application data update task memory access of to a at least one subregion comprises assigning memory access to a plurality of subregions across a plurality of memory units of more than one control computer so as to provide the application data update task with the ability to write data parameters to the plurality of memory units.

In this example the avionics control system has a plurality of control computers S1-S4 coupled in a network 2.

In one example the step 120 of orchestrating the at least one application data update task is performed prior to initialization of the at least one application task or task set.

In one example the step 120 of orchestrating said at least on application data update task performed prior to initiating an initialization procedure of the at least one application task or task set.

In one example the step 130 of re-configuring the at least one memory control device is performed substantially prior to completion of an initialization procedure of the at least one application task or task set.'

In one example the step 130 of re-configuring the at least one memory control device comprises that the partitioning operating system orchestrates instructions associated to an API providing services to control the memory control device.

Many modifications and variations will be apparent to practitioners skilled in the art without departing from the scope of the invention as defined in the appended claims. The examples were chosen and described in order to best explain the principles of the invention and its practical applications, thereby enabling others skilled in the art to understand the invention for various examples and with various modifications as suited to the particular use contemplated.

The invention claimed is:

1. A method for managing memory access of an avionics control system having at least one control computer, at least one memory unit having a partitioning operating system and at least one application task or task set stored thereon, at least one processor arranged to orchestrate the partitioning operating system and the at least one application task or task set, at least one memory control device arranged to control memory access of the at least one processing device to the at least one memory unit, the method comprising:

assigning each of said at least one application task or task set memory access to at least one unique memory region of said at least one memory unit, assigning at least one application data update task memory access to at least one subregion of one or more of the at least one unique memory region, wherein the at least one subregion is arranged to store one or more data parameter of constant data type used to initialize data of the at least one application task or task set during an initialization procedure of said at least one application task or task set, orchestrating said at least one application data update task in order to write at least one data parameter to the one or more of the at least one subregion, and re-configuring the at least one memory control device in order to de-activate memory access of said at least one application data update task so as to protect said at least one subregion and thereby prevent any data parameter of the one or more of the at least one subregion to be overwritten, wherein the step of re-configuring the at least one memory control device is performed prior to completion of the initialization procedure of the at least one application task or task set.

2. The method according to claim 1, wherein assigning each of said at least one application task or task set memory access, further comprises assigning at least one memory access right attribute so that each of the at least one application task or task set only has a read access to the at least one subregion of its uniquely associated memory region.

3. The method according to claim 1, wherein assigning at least one application data update task memory access further comprises assigning at least one memory access right attribute so that each of the at least one application data update task at least have a write access to the one or more of the at least one subregion.

4. The method according to claim 1, wherein the at least one application data update task is stored on one or more of the at least one memory unit.

5. The method according to claim 1, wherein the at least one application data update task is part of one or more of the at least one application task or task set.

6. The method according to claim 1, wherein the avionics control system comprises a plurality of control computers coupled in a network, and wherein assigning at least one application data update task memory access of to a at least one subregion comprises assigning memory access to a plurality of subregions across a plurality of memory units of more than one control computer so as to provide the application data update task with the ability to write data parameters to the plurality of memory units.

7. The method according to claim 1, wherein orchestrating the at least one application data update task is performed prior to initialization of the at least one application task or task set.

8. The method according to claim 1, wherein orchestrating said at least on application data update task performed prior to initiating an initialization procedure of the at least one application task or task set.

9. The method according to claim 1, wherein the at least one data parameter is related to at least one constant data type selected from a group comprising constants, mathematical expressions, system scheduling data, database contents, registers.

10. The method according to claim 1, wherein said partitioning operating system is an ARINC 653 compliant operating system.

11. The method according to claim 1, wherein re-configuring the at least one memory control device comprises that the partitioning operating system orchestrates instructions associated to an API providing services to control the memory control device.

12. An avionics control system having functionality for managing memory access, the avionics control system comprising:
at least one control computer comprising:
at least one memory unit having a partitioning operating system and at least one application task or task set stored thereon,
at least one processor arranged to orchestrate the partitioning operating system and the at least one application task or task set,
at least one memory control device set to enabled mode and arranged to control memory access of the at least one processing device to the at least one memory unit, and wherein each of the at least one application task or task set is assigned memory access of at least one unique memory region of said at least one memory unit, wherein the at least one memory unit having at least one application data update task stored thereon, the at least one application data update task is assigned with memory access to at least one subregion of one or more of the at least one unique memory region, wherein the at least one subregion is arranged to store one or more data parameter of constant data type used to initialize data of the at least one application task or task set during an initialization procedure of said at least one application task or task set, the at least one application data update task is arranged during orchestration to write at least one data parameter to the one or more of the at least one subregion, and
wherein the at least one memory control device is arranged to de-activate memory access of said at least one application data update task, based on being re-configured so as to protect said at least one subregion and thereby prevent any data parameter of the one or more of the at least one subregion to be subsequently overwritten, wherein the at least one memory control device is being re-configured prior to completion of the initialization procedure of the at least one application task or task set.

13. A computer program product for managing memory access of an avionics correct system having at least one control computer, at least one memory unit having a partitioning operating system and at least one application task or task set stored thereon, at least one processor arranged to orchestrate the partitioning operating system and the at least one application task or task set, at least one memory control device arranged to control memory access of the at least one processing device to the at least one memory unit, comprising:
a non-transitory computer readable medium; and
a program code recorded on the non-transitory computer readable medium for performing a method when said computer program is run on a computer, the method comprising
assigning at least one application data update task memory access to at least one subregion of one or more of the at least one unique memory region wherein the at least one subregion is arranged to store one or more data parameter of constant data type used to initialize data of the at least one application task or task set during an initialization procedure of said at least one application task or task set,
orchestrating said at least one application data update task in order to write at least one data parameter to the one or more of the at least one subregion, and
re-configuring the at least one memory control device in order to de-activate memory access of said at least one application data update task so as to protect said at least one subregion and thereby prevent any data parameter of the one or more of the at least one subregion to be overwritten wherein the step of re-configuring the at least one memory control device is performed prior to completion of the initialization procedure of the at least one application task or task set.

* * * * *